UNITED STATES PATENT OFFICE.

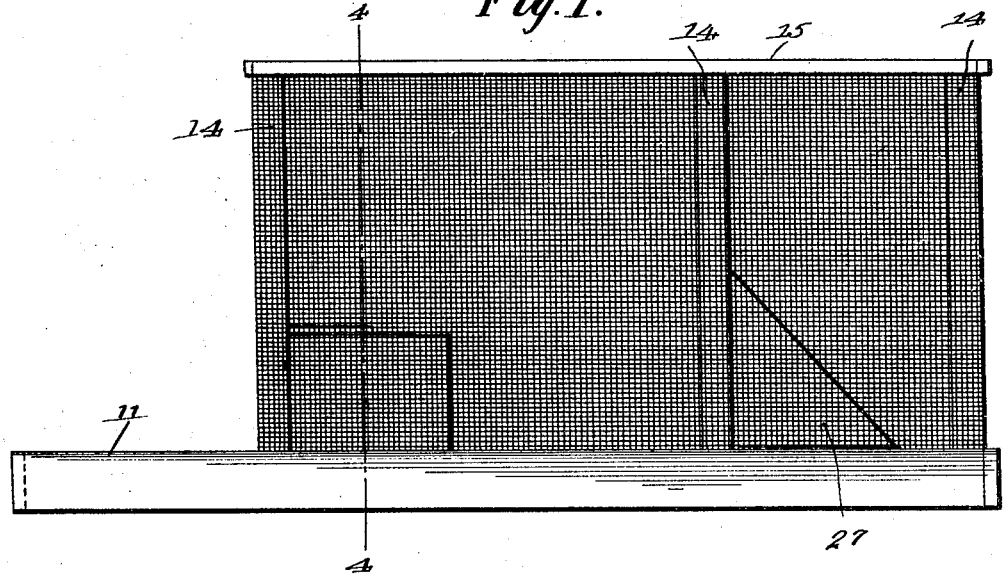
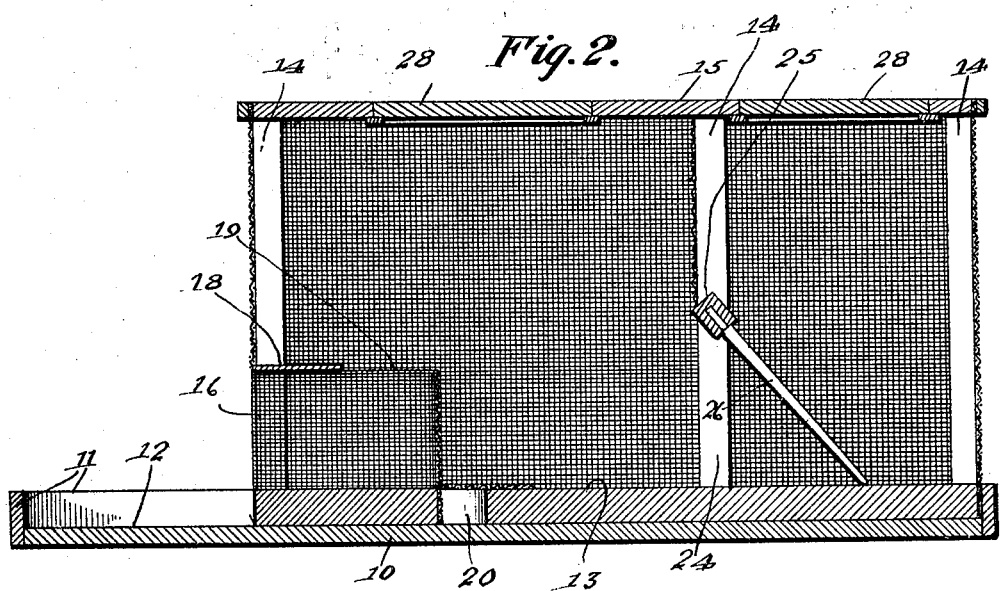

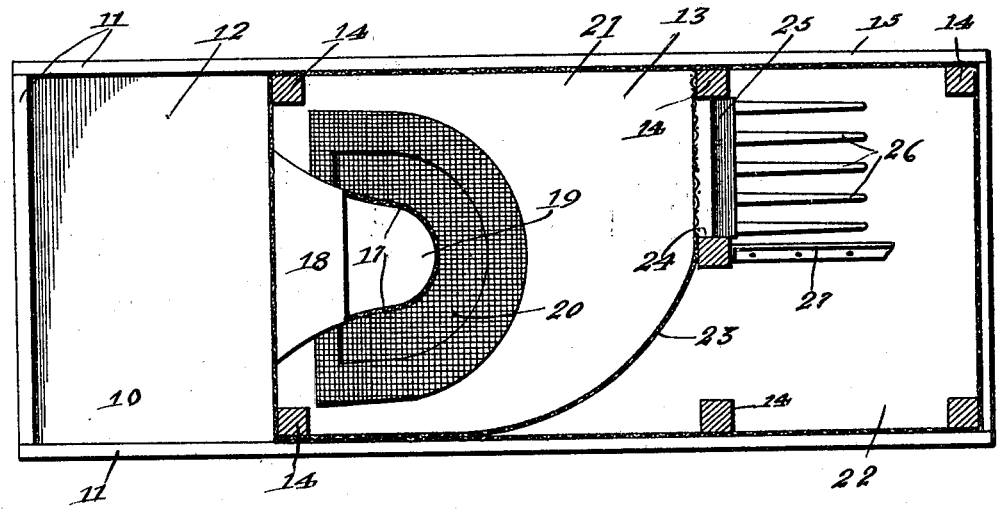
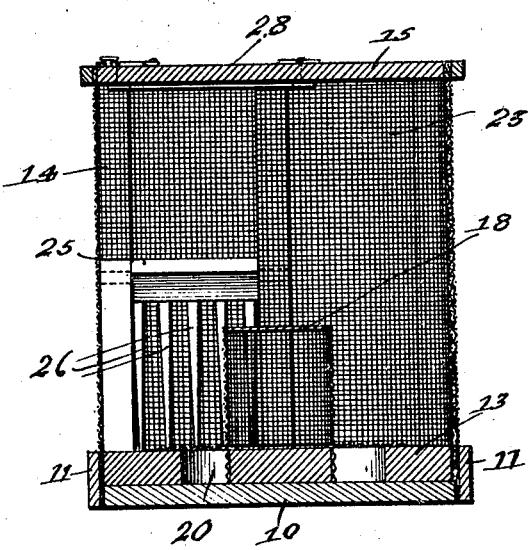

HENRY F. MAYSE, OF GIRVIN, TEXAS.

TRAP.

1,326,080.  Specification of Letters Patent.  Patented Dec. 23, 1919.

Application filed July 29, 1919. Serial No. 313,996.

*To all whom it may concern:*

Be it known that I, HENRY F. MAYSE, a citizen of the United States, residing at Girvin, in the county of Pecos and State of Texas, have invented new and useful Improvements in Traps, of which the following is a specification.

This invention relates to traps, especially designed for catching birds.

An object of the present invention is the provision of a trap of this character having a novel form of entrance opening, which at all times remains open, the arrangement being such as to permit of an easy entrance to render outward passage difficult.

Another object is the provision of a novel form of bait container, which is at all times within plain sight of a bird, but is inaccessible even after entrance into the trap has been effected.

Other objects and advantages of the invention will appear as the following description is read in connection with the accompanying drawings.

In the drawings:

Figure 1 is a side elevation of a trap embodying the present invention.

Fig. 2 is a vertical longitudinal sectional view.

Fig. 3 is a horizontal section.

Fig. 4 is a transverse section on a line 4—4 of Fig. 1.

Referring to the drawings in detail, wherein like characters of reference denote corresponding parts, the trap comprises a base 10, which is preferably surrounded by a flange 11, said base and flange extending beyond the front of the trap to form a platform 12.

The floor of the trap is indicated at 13, and is slightly raised from the top of the base 10, being mounted upon said base. The walls of the trap are formed of woven wire or other reticulated material and extend upward from between the edges of the floor 13 and the flange 11, and are supported by and connected to upright members 14. The top of the trap is closed by a cover 15 secured to these upright members.

The front wall of the trap is provided with a substantially rectangular entrance opening 16, and extending inwardly from the side edges of this opening is a vertically disposed slot 17, the latter being of elongated formation, so as to provide what might be termed a vestibule entrance. The top of the wall 17 is connected by a cover plate 18, the latter extending from the front wall at the upper edge of the opening 16 and terminating short of the length of the wall 17, so as to provide an entrance opening 19.

Formed in the floor 13 of the trap, and partly surrounding the wall 17, is a slot or depression 20, the latter being adapted to receive a suitable bait, such as corn, oats and the like, and forming a bait receptacle. This receptacle is closed by a cover of woven wire, or other reticulated material, so that the bait therein will all times be within plain view, but will be inaccessible even after a bird has entered the trap.

The trap is divided into two compartments 21 and 22, through the medium of a partition 23. Communication is established between the compartments 21 and 22, through the medium of an opening 24, located adjacent one of the side walls of the trap. Pivotally mounted at the top of this opening is a bar 25, and extending from this bar into the compartments 22, are parallel rods 26, which when in their lowered position are disposed at an incline and act to close the opening 24. Extending into the compartment 22 from one side of the opening and parallel with the side walls of the trap, is a wall 27, the said wall being in close proximity to one of the outside rods 26, so that a passage is formed which extends into the compartment 22 in the opening 24, the inner end of which is closed by a door formed by the bar 25 and the rods 26.

A bird entering the trap in an endeavor to obtain the bait will pass upward through the opening 19, and in its attempt to escape will pass from the compartment 21 to the compartment 22 through the opening 24, and will again be securely caged in the latter compartment. Access may be obtained to either of the compartments through the medium of doors 28 located in the top 15.

The invention is susceptible of various changes in its form, proportions and minor details of construction and the right is herein reserved to make such changes as properly fall within the scope of the appended claims.

Having described the invention, what is claimed is:

1. A trap comprising a receptacle, an entrance opening in the front wall thereof, a vertically disposed wall rising from the floor and extending into the receptacle from one side of the entrance opening and returning to the opposite side thereof to form a compartment, a wall extending from the front of the receptacle above the entrance opening and over the vertically disposed wall and terminating short of the latter to provide communication with the interior of the receptacle.

2. A trap comprising a receptacle, an entrance opening in the front wall thereof, a vertically disposed wall rising from the floor and extending into the receptacle from one side of the entrance opening and returning to the opposite side thereof to form a compartment, a wall extending from the front of the receptacle above the entrance opening and over the vertically disposed wall and terminating short of the latter to provide communication with the interior of the receptacle and a covered bait containing depression within the receptacle.

3. A trap comprising a receptacle, an entrance opening in the front wall thereof, a vertically disposed wall rising from the floor and extending into the receptacle from one side of the entrance opening and returning to the opposite side thereof to form a comparment, a wall extending from the front of the receptacle above the entrance opening and over the vertically disposed wall and terminating short of the latter to provide communication with the interior of the receptacle, a bait receiving depression surrounding the vertically disposed wall and a foraminous cover for said depression.

In testimony whereof I affix my signature.

HENRY F. MAYSE.